United States Patent Office 3,102,115
Patented Aug. 27, 1963

3,102,115
SULFONYLUREA COMPOUNDS
Hermann Breuer and Hans Hoehn, Regensburg, Germany, assignors to Olin Mathieson Chemical Corporation, New York, N.Y., a corporation of Virginia
No Drawing. Filed Aug. 20, 1962, Ser. No. 218,155
Claims priority, application Germany Apr. 11, 1962
11 Claims. (Cl. 260—239)

This invention relates to basic derivatives of sulfonylureas. More particularly, the invention relates to basic sulfonylurea derivatives of the following formula (I) 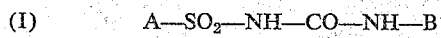

and to acid addition salts of such basic compounds.

A in the above formula represents the nine membered, bicyclic indan, cumaran, dihydrothionaphthene, indoline and indole ring systems. The sulfonyl moiety is attached to one of the carbon atoms of the benzene ring. B represents a basic nitrogen containing radical of less than 12 carbon atoms.

In its preferred aspects, the invention relates to compounds having the structural formulae (II) 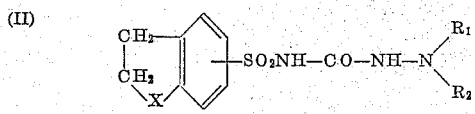

(III) 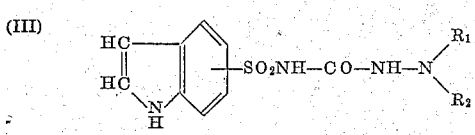

with special preference for those compounds in which the sulfonylurea moiety is attached to the ring in either the 5 or 6-position.

In Formula II, the symbol X represents $CH_2$, NH, NCOR, O or S forming, respectively, the indan, indoline, N-acylindoline, cumaran and dihydrothionaphthene bicyclic ring systems. To these, Formula III adds the indole ring system. In both Formulas II and III, $R_1$ and $R_2$ each represents lower alkyl, e.g. straight and branched chain saturated aliphatic groups, such as methyl, ethyl, propyl, isopropyl, butyl, isobutyl, t-butyl, amyl, isoamyl, hexyl and the like, hydroxy-lower alkyl and phenyl-lower alkyl. R in the structure N—CO—R is lower alkyl, e.g. straight and branched chain saturated aliphatic groups such as methyl, ethyl, propyl, isopropyl, isoamyl, hexyl and the like.

The radical
(IV) 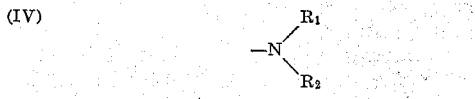

thus includes such basic groups as diloweralkylamino, e.g. dimethylamino, diethylamino, dipropylamino, di(hydroxylower alkyl)amino, e.g. di(hydroxyethyl)amino, and benzyl methylamino and the like. Furthermore the nitrogen may join with the groups represented by $R_1$ and $R_2$ to form a 5 to 7-membered monocyclic heterocyclic containing, if desired, an oxygen, sulfur or an additional nitrogen atom that is, the symbols $R_1$ and $R_2$ represent together a tetramethylene, pentamethylene, hexamethylene, oxatetramethylene, oxapentamethylene, oxahexamethylene, azatetramethylene, azapentamethylene azahexamethylene, thiatetramethylene, thiapentamethylene or thiahexamethylene chain. The heterocyclic group may also be substituted by one or two of the following: lower alkyl, lower alkoxy, nitro or halo.

Thus the heterocyclic groups represented by the radical IV include, for example, piperidino; (lower alkyl)piperidino, e.g. methylpiperidino; di(lower alkyl)piperidino, e.g. dimethylpiperidino; (lower alkoxy)piperidino, e.g. methoxypiperidino; pyrrolidino; (lower alkyl)pyrrolidino, e.g. methylpyrrolidino; di(lower alkyl)pyrrolidino, e.g. dimethylpyrrolidino; (lower alkoxy)pyrrolidino, e.g. ethoxypyrrolidino; morpholino; (lower alkyl)morpholino, e.g. 2-methylmorpholino; di(lower alkyl)morpholino, e.g. 2,3-dimethylmorpholino; (lower alkoxy)morpholino, e.g. ethoxymorpholino, thiamorpholino; (lower alkyl)thiamorpholino, e.g. 2-methylthiamorpholino; di(lower alkyl) thiamorpholino, e.g. 2,3-dimethylthiamorpholino; (lower alkoxy)thiamorpholino, e.g. 2 - methoxythiamorpholino; piperazino; (lower alkyl)piperazino, e.g. $N_4$-methylpiperazino and 2-methylpiperazino; di(lower alkyl)piperazino, e.g. 2,3-dimethylpiperazino; (lower alkoxy)piperazino, e.g. 2-methoxypiperazino; hexamethyleneimino; homopiperazino; homomorpholino, pyridazino; pyrimidino; (lower alkyl)pyrimidino, e.g. isopropylpyrimidino and the like.

The bases of Formula I form acid addition salts with the common inorganic and organic acids. Such inorganic salts as the hydrohalides, e.g. hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g. methanesulfonate, benzenesulfonate, toluenesulfonate and the like are also within the scope of the invention.

The compounds of this invention may be produced by several methods. According to one method, sulfonylcarbamic acid esters of the formula

are reacted with basic compounds of the formula

to form the desired sulfonylurea derivatives. In place of the sulfonylcarbamic acid esters one may use sulfonylisocyanates of the formula

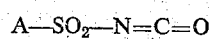

sulfonylureas of the formula

or their acyl derivatives and sulfonylcarbamic acid halides of the formula

According to another method a sulfonamide of the formula

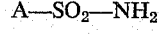

preferably in the form of its alkali metal salt, is reacted with an isocyanate of the formula

A and B in the above formulas have the same meaning as defined above. Instead of the isocyanate, other compounds which behave in the same manner as the isocyanate under such conditions, may also be used.

In addition, the sulfonamides or the alkali metal salts, described above, will react with appropriately substituted derivatives of carbonic acids. Particularly useful derivatives of carbonic acids are carbamic acid esters of the formula

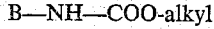

carbamic acid chlorides of the formula

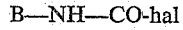

wherein hal is a halogen, preferably chlorine, or a monoacyl urea of the formula

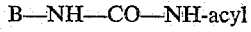

wherein B has the same significance described above and "acyl" represents the acid radical of a hydrocarbon carboxylic acid of less than ten carbon atoms, preferably acetic acid.

Thus for example 5-indansulfonyl isocyanate will react with N-aminopiperidine, preferably in an inert solvent, to yield the desired product. As another example, ethyl-6-cumaransulfonylcarbamate reacts with N-aminohexamethyleneimine. Still another example is the reaction of indolinesulfonyl urea with N-aminopyrrolidine. In addition, 5-indansulfonylcarbamic acid chloride reacts with N-aminohexylmethyleneimine in the presence of an acid binding agent.

According to another approach, a sulfonylthiourea of the formula

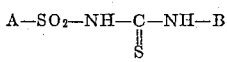

or a sulfonylguanidine of the formula

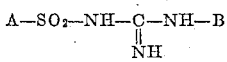

is first produced and this is converted to the desired product of Formula I by splitting off hydrogen sulfide or ammonia, as the case may be, under hydrolytic conditions.

Similarly, the compounds of Formula I may also be produced from sulfonic acid halides of the formula

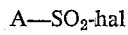

by reaction with an isourea alkyl ether of the formula

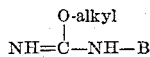

and saponifying the intermediate obtained to produce the desired sulfonyl urea.

The acid addition salts are formed by reaction of the base with an excess of the appropriate acid.

The compounds of this invention are hypoglycemic agents which are effective in lowering blood sugar content in mammals. They are particularly noteworthy in their long duration of action. The compounds of Formula I or physiologically acceptable acid addition salts thereof may be administered orally in conventional dosage forms such as tablets, capsules and the like, prepared according to conventional practice.

The following examples are illustrative of the invention. All melting points are expressed in degrees centigrade (uncorrected).

EXAMPLE 1

*1-(5-Indansulfonyl)-3-(1-Hexahydroazepinyl)-Urea*

(A) PREPARATION OF N-NITROSOHEXAMETHYLENEIMINE

A solution of 50 grams of hexamethyleneimine in 51 ml. of 10 N hydrochloric acid is heated to 70° C. on a steam bath. To this solution there is added dropwise, with vigorous stirring, a solution of 35 grams of sodium nitrite in 50 ml. of water. The reaction mixture is kept at 70–75° for two hours after the addition is completed and is then cooled. The organic phase is separated from the reaction mixture and the aqueous solution extracted with ether. The organic phase is then combined with the ether extract and dried over anhydrous magnesium sulfate. The ether solution is then filtered, concentrated to remove the solvent, and then distilled under reduced pressure to yield the N-nitrosohexamethyleneimine as a yellow oil, boiling at 125–130° at 30 mm.

(B) PREPARATION OF N-AMINOHEXAMETHYLENEIMINE

To a mixture of 13 grams of lithium aluminum hydride and 500 ml. of anhydrous ether, there is added slowly with vigorous stirring a solution of 43 grams of N-nitrosohexamethyleneimine in 100 ml. of anhydrous ether. The rate of addition is controlled so that gentle reflux of the reaction mixture is maintained. After the addition of the nitroso compound is complete, the reaction mixture is refluxed for two hours on a steam bath and then cooled in an ice-bath. There is added dropwise to the cooled, well-stirred reaction mixture 50 ml. of water. The addition of the water is regulated so that the exothermic reaction is completed before additional water is added. There is then added slowly to the reaction mixture 10 ml. of 20% aqueous sodium hydroxide solution.

The organic phase is separated and the inorganic solid removed from the aqueous phase by filtration. The inorganic solid is washed twice with ether and the aqueous phase extracted three times with ether. The organic phase is combined with the ether extracts, dried over anhydrous magnesium sulfate and filtered. The filtrate is concentrated to remove the ether and the residue fractionally distilled to yield the desired N-aminohexamethyleneimine as a colorless oil.

(C) PREPARATION OF 1-(5-INDANSULFONYL)-3-(1-HEXAHYDROAZEPINYL) UREA 24 grams of ethyl 5-indansulfonyl carbamate are triturated with 11.6 grams of N-aminohexamethyleneimine. Upon warming, salt formation occurs. The mixture is then warmed on a boiling water bath until a homogeneous syrup results. The syrup is then heated for an additional 30 minutes under water vacuum. The solidified residue is cooled, triturated with a little water, filtered under suction, washed with water and dried. There are obtained 26.9 grams of 1-(5-indansulfonyl)-3-(1-hexahydroazepinyl) urea which is recrystallized from methanol, M.P. 169–170°.

EXAMPLE 2

*1-(5-Indansulfonyl)-3-(1-Piperidyl)Urea*

By reacting 24 grams of ethyl 5-indansulfonylcarbamate with 10.0 grams of N-aminopiperidine according to the procedure described in Example 1C there is obtained 1-(5-indansulfonyl)-3-(1-piperidyl)urea, M.P. 191–192°.

EXAMPLE 3

*1-(2,3-Dihydro-6-Thionaphthenesulfonyl)-3-(1-Piperidyl)Urea*

(A) PREPARATION OF ETHYL 2,3-DIHYDRO-6-THIONAPHTHENESULFONYL CARBAMATE

To a mixture of 21.5 grams of 2,3-dihydro-6-thionaphthenesulfonamide, 13.8 grams of anhydrous potassium carbonate and 200 ml. of dry acetone there is added slowly 13.7 grams of ethyl chlorocarbonate. The resulting mixture is refluxed with vigorous stirring for twenty hours, cooled and filtered. The solid is dissolved in water and carefully acidified to give ethyl 2,3-dihydro-6-thionaphthenesulfonylcarbamate, M.P. 106–108°.

(B) PREPARATION OF 1-(2,3-DIHYDRO-6-THIONAPHTHENESULFONYL-3-(1-PIPERIDYL)UREA

By reacting 14.4 grams of ethyl 2,3-dihydro-6-thionaphthenesulfonylcarbamate with 5.0 grams of N-aminopiperidine according to the procedure described in 1C there is obtained 1-(2,3-dihydro-6-thionaphthenesulfonyl)-3-(1-piperidyl)urea, melting at 194–196°.

EXAMPLE 4

*1-(6-Cumaransulfonyl)-3-(1-Piperidyl)Urea*

(A) PREPARATION OF ETHYL 6-CUMARANSULFONYLCARBAMATE

By reacting 19.9 grams of 6-cumaransulfonamide with 13.7 grams of ethyl chlorocarbamate as in Example 3A, there is obtained ethyl 6-cumaransulfonylcarbamate, M.P. 125–127°.

(B) PREPARATION OF 1-(6-CUMARANSULFONYL)-3-(1-PIPERIDYL)UREA

By reacting 13.6 grams of ethyl 6-cumaransulfonylcarbamate with 5.0 grams of N-aminopiperidine according to the procedure described in 1C there is obtained 1-(6-cumaransulfonyl)-3-(1-piperidyl)urea, M.P. 195–196.5°.

EXAMPLE 5

1-(4-Indansulfonyl)-3-(4-Methyl-1-Piperazinyl)Urea (a) A solution of 19.8 g. of 4-indansulfonic acid, 20 ml. of thionyl chloride and 1.0 ml. of N,N-dimethylformamide, is refluxed for three hours and concentrated in vacuo to remove the excess of thionyl chloride. The residue, consisting of 4-indansulfonyl-4-sulfonyl chloride, is dissolved in ether and added slowly to 100 ml. of concentrated aqueous ammonia, with external cooling. The solid which forms is filtered and washed with water to give 4-indansulfonamide.

(b) To 19.7 g. of 4-indansulfonamide, 13.8 g. of anhydrous potassium carbonate, and 200 ml. of dry acetone is added slowly 13.7 g. of ethyl chlorocarbonate. The resulting mixture is stirred and refluxed overnight, cooled and the solid filtered. The solid is dissolved in water and carefully acidified to give ethyl 4-indansulfonylcarbamate.

(c) By reacting 24 grams of ethyl 4-indansulfonylcarbamate with 11.5 grams of 1-amino-4-methylpiperidine according to the procedure described in Example 1C there is obtained 1-(4-indansulfonyl)-3-(4-methyl-1-piperazinyl)urea.

EXAMPLE 6

1-(5-Indolesulfonyl)-3-(4-Morpholino)Urea (a) 16.1 g. of N-acetylindoline are introduced with stirring into 58.5 g. of chlorosulfonic acid. The mixture is stirred for two hours at 60°, and after cooling, it is poured onto ice. The precipitated sulfonyl chloride is filtered with suction and the product washed with water. 22.6 g. of product are obtained which is recrystallized from benzene, M.P. 172–173°.

(b) 16.1 g. of the 1-acetyl-5-indolinesulfonyl chloride are introduced into 900 ml. of approximately 15% aqueous ammonia water and stirred for three hours at room temperature. At the end of the reaction, the product is filtered with suction, dissolved in dilute sodium hydroxide solution, the solution is treated with activated charcoal, filtered and the filtrate acidified with dilute acetic acid. 18.4 g. of 1-acetyl-5-indolinesulfonamide are obtained which is recrystallized from 80% alcohol, M.P. 228–229°.

(c) The 1-acetyl-5-indolinesulfonamide obtained above is hydrolyzed with sodium hydroxide solution to obtain the free 5-indolinesulfonamide (M.P. 163–165°). 2 g. of 5-indolinesulfonamide are boiled under reflux with 2.5 g. of chloranil in 30 ml. of ethylene glycol dimethyl ether for 30 minutes. The solvent is distilled off under vacuum and the residue is triturated with water and filtered. The product is dried and triturated with ether to obtain 1.8 g. of 5-indolesulfonamide, which is recrystallized from acetone, M.P. 208°.

(d) Preparation of ethyl 5-indolesulfonylcarbamate.—By reacting 19.6 grams of 5-indolesulfonamide with 13.7 grams of ethyl chlorocarbonate as in Example 3A there is obtained ethyl 5-indolesulfonylcarbamate.

(e) Preparation of 1-(5-indolesulfonyl)-3-(4-morpholino)urea.—By reacting 13.5 grams of ethyl 5-indolesulfonylcarbamate with 5.2 grams of 4-aminomorpholine according to the procedure described in 1C there is obtained 1-(5-indolesulfonyl)-3-(4-morpholino)urea.

EXAMPLE 7

1-(6-Indolinesulfonyl)-3-(Benzylmethylamine)Urea (a) 175 grams of 4-(β-chloroethyl)benzenesulfonyl chloride (M.P. 54–56°) is added gradually with vigorous stirring at 20 to 30° to a mixture of 280 grams of anhydrous potassium nitrate and 420 grams of concentrated sulfuric acid. Ice cooling is used to prevent the temperature from exceeding 30°. The reaction mixture is then vigorously stirred at 25 to 30° for an additional 2 hours. The reaction mixture is poured with stirring into a mixture of ice and water whereupon 3-nitro-4-(β-chloroethyl)benzenesulfonyl chloride precipitates. The product is filtered under suction and is washed with water. The damp filtrate residue is introduced with vigorous stirring into an ice cooled mixture of 600 ml. of concentrated ammonia and 600 ml. of water and stirred for another 3 hours. The product, 3-nitro-4-(β-chloroethyl)benzenesulfonamide, is filtered under suction. After drying, 168 grams of crude product are obtained which have a melting point of 165–166°. After recrystallization from ethyl acetate, the M.P. is 166–167°.

(b) 26 grams of 3-nitro-4-(β-chloroethyl)benzenesulfonamide are suspended in 200 ml. of ethyl acetate and, after the addition of Raney nickel catalyst, are hydrogenated at normal pressure and room temperature until no more hydrogen is taken up. Over a period of 60 minutes, 7.4 liters of hydrogen are taken up. The catalyst is then separated by filtration and the solvent is completely distilled off in vacuo. The residue is dissolved in 600 ml. of 0.5 N sodium hydroxide solution and heated on a boiling water bath for one hour. After cooling, the solution is treated with activated charcoal, filtered and the product 6-indolinesulfonamide, precipitated with dilute acetic acid. 16.6 grams with a M.P. of 169° are obtained. The product may also be recrystallized from dilute ethanol without changing the melting point.

(c) Preparation of ethyl 6-indolinesulfonylcarbamate.—By reacting 19.8 of 6-indolinesulfonamide with 13.7 grams of ethyl chlorocarbonate as in Example 3A there is obtained ethyl 6-indolinesulfonylcarbamate.

(d) Preparation of 1-(6-indolinesulfonyl)-3-(benzylmethylamino)urea.—By reacting 13.7 grams of ethyl 6-indolinesulfonylcarbamate with 6.8 grams of N-benzyl-N-methylhydrazine according to the procedure described in 1C there is obtained 1-(6-indolinesulfonyl)-3-(benzylmethylamino)urea.

EXAMPLE 8

1-(1-Acetyl-5-Indolinesulfonyl)-3-(2,5-Dimethyl-1-Pyrrolidinyl)Urea (A) PREPARATION OF ETHYL 1-ACETYL-5-INDOLINESULFONYLCARBAMATE By reacting 24 grams of 1-acetyl-5-indolinesulfonamide, as prepared in Example 6b with 13.7 grams of ethyl chlorocarbonate as in Example 3A there is obtained ethyl 1-acetyl-5-indolinesulfonylcarbamate.

(B) PREPARATION OF 1-(1-ACETYL-5-INDOLINESULFONYL)-3-(2,5-DIMETHYL-1-PYRROLIDINYL)UREA

By reacting 15.6 grams of ethyl 1-acetyl-5-indolinesulfonylcarbamate with 5.7 grams of 1-amino-2,5-dimethylpyrrolidine according to the procedure described in 1C there is obtained 1-(1-acetyl-5-indolinesulfonyl)-3-(2,5-dimethyl-1-pyrrolidinyl)urea.

EXAMPLE 9

1-(5-Indansulfonyl)-3-(1-Piperidyl)Urea 2.4 grams of 5-indansulfonylurea obtained by the reaction of ethyl 5-indansulfonylcarbamate with alcoholic ammonia and 1.1 grams of N-aminopiperidine are triturated. The mixture is heated on a boiling bath under water vacuum. The glassy residue is then triturated with water and after a while the product which crystallizes is filtered under vacuum. The product, 1-(5-indansulfonyl)-3-(1-piperidyl)urea, is recrystallized from methanol, M.P. 187–190°.

EXAMPLE 10

1-(5-Indansulfonyl)-3-(1-Piperidyl)Urea 24 grams of 5-indansulfonylurea and 11 grams of N-aminopiperidine in 100 ml. of chlorobenzene are refluxed for 15 minutes. There is an evolution of amine and a clear solution results. The chlorobenzene is distilled off in vacuo and the residue is dried, triturated with water and filtered under suction. The product 1-(5-indansulfonyl)-3-(1-piperidyl)urea is crystallized from methanol, M.P. 189–191°.

EXAMPLE 11

*1-(5-Indansulfonyl)-3-(2,6-Dimethyl-1-Piperidyl)Urea*

(A) PREPARATION OF 5-INDANSULFONYLISOCYANATE

A solution of 197 grams of 5-indansulfonamide in 600 ml. of trichlorobenzene is heated to reflux and a stream of phosgene passed through the boiling solution until the reaction is completed. The reaction is completed when the exit gas no longer contains hydrogen chloride. The solvent is then removed under reduced pressure and the residue fractionally distilled under reduced pressure to yield the desired 5-indansulfonylisocyanate.

(B) PREPARATION OF 1-(5-INDANSULFONYL)-3-(2,6-DIMETHYL-1-PIPERIDYL)UREA

To a cooled solution of 22.3 grams of 5-indansulfonylisocyanate in 250 ml. of anhydrous ether there is added slowly a solution of 12.8 grams of 2,6-dimethyl-1-aminopiperidine in 50 ml. of anhydrous ether. After the addition is complete, the reaction mixture is refluxed for two hours and the precipitated 1-(5-indansulfonyl)-3-(2,6-dimethyl-1-piperidyl)urea recovered by filtration. An additional quantity of product is obtained by concentration of the solvent. The product may be crystallized from ethanol.

EXAMPLE 12

*1-(5-Indansulfonyl)-3-(3-Methoxy-1-Piperidyl)Urea*

(A) PREPARATION OF 3-METHOXY-1-NITROSOPIPERIDINE

Following the procedure of Example 1A but substituting 57 grams of 3-methoxypiperidine for the hexamethyleneimine, there is obtained 3-methoxy-1-nitrosopiperidine.

(B) PREPARATION OF 1-AMINO-3-METHOXYPIPERIDINE

Following the procedure of Example 1B but substituting 48 grams of 3-methoxy-1-nitrosopiperidine for the N-aminohexamethyleneimine, there is obtained 1-amino-3-methoxypiperidine.

(C) PREPARATION OF 1-(5-INDANSULFONYL)-3-(3-METHOXY-1-PIPERIDYL)UREA

Following the procedure of Example 1C but substituting 13.0 grams of 1-amino-3-methoxy-piperidine for the N-aminohexamethyleneimine there is obtained 1-(5-indansulfonyl)-3-(3-methoxy-1-piperidyl)urea.

EXAMPLE 13

*1-(5-Indansulfonyl)-3-(4-Homomorpholinyl)Urea*

(A) PREPARATION OF 4-NITROSOHOMOMORPHOLINE

Following the procedure of Example 1A but substituting 50.5 grams of homomorpholine for the hexamethyleneimine, there is obtained 4-nitrosohomomorpholine.

(B) PREPARATION OF 4-AMINOHOMOMORPHOLINE

Following the procedure of Example 1B but substituting 43.3 grams of 4-nitrosohomomorpholine for the N-nitrosohexamethyleneimine there is obtained 4-aminohomomorpholine.

(C) PREPARATION OF 1-(5-INDANSULFONYL)-3-(4-HOMOMORPHOLINYL)UREA

Following the procedure of Example 1C but substituting 11.6 grams of 4-aminohomomorpholine for the N-aminohexamethyleneimine there is obtained 1-(5-indansulfonyl)-3-(4-homomorpholinyl)urea.

EXAMPLE 14

*1-(2-3-Dihydro-6-Thionaphthenesulfonyl)-3-(4-Methyl-1-Homopiperazinyl)Urea*

(A) PREPARATION OF 1-METHYL-4-NITROSOHOMOPIPERAZINE

Following the procedure of Example 1A but substituting 57 grams of 1-methylhomopiperazine for the hexamethyleneimine, there is obtained 1-methyl-4-nitrosohomopiperazine.

(B) PREPARATION OF 1-AMINO-4-METHYLHOMOPIPERAZINE

Following the procedure of Example 1B but substituting 48 grams of 1-methyl-4-nitrosohomopiperazine for the N-nitrosohexamethyleneimine there is obtained 1-amino-4-methylhomopiperazine.

(C) PREPARATION OF 1-(2,3-DIHYDRO-6-THIONAPHTHENESULFONYL)-3-(4-METHYL-1-HOMOPIPERAZINYL)UREA

Following the procedure of Example 3B but substituting 6.5 grams of 1-amino-4-methyl homopiperazine for the N-aminopiperidine there is obtained 1-(2,3-dihydro-6-thionaphthenesulfonyl)-3-(4-methyl-1-homopiperazinyl)urea.

EXAMPLE 15

*1-(6-Cumaransulfonyl)-3-(4-Thiamorpholinyl)Urea*

(A) PREPARATION OF 4-NITROSOTHIAMORPHOLINE

Following the procedure of Example 1A but substituting 52 grams of thiamorpholine for the hexamethyleneimine there is obtained 4-nitrosothiamorpholine.

(B) PREPARATION OF 4-AMINOTHIAMORPHOLINE

Following the procedure of Example 1A but substituting 41 grams of 4-nitrosothiamorpholine for the N-nitrosohexamethyleneimine, there is obtained 4-aminothiamorpholine.

(C) PREPARATION OF 1-(6-CUMARANSULFONYL)-3-(4-THIAMORPHOLINYL)UREA

Following the procedure of Example 4B but substituting 5.9 grams of 4-aminothiamorpholine for the N-aminopiperidine there is obtained 1-(6-cumaransulfonyl)-3-(4-thiamorpholinyl)urea.

EXAMPLE 16

*1-(5-Indansulfonyl)-3-(2,3-Dimethyl-4-Thiamorpholinyl)Urea*

(A) PREPARATION OF 2,3-DIMETHYL-4-NITROSOTHIAMORPHOLINE

Following the procedure of Example 1A but substituting 66 grams of 2,3-dimethylthiamorpholine for the hexamethyleneimine there is obtained 2,3-dimethyl-4-nitrosothiamorpholine.

(B) PREPARATION OF 4-AMINO-2,3-DIMETHYLTHIAMORPHOLINE

Following the procedure of Example 1B but substituting 53.3 grams of 2,3-dimethyl-4-nitrosothiamorpholine for the N-nitrosohexamethyleneimine there is obtained 4-amino-2,3-dimethylthiamorpholine.

(C) PREPARATION OF 1-(5-INDANSULFONYL)-3-(2,3-DIMETHYL-4-THIAMORPHOLINYL)UREA

Following the procedure of Example 1C but substituting 14.6 grams of 4-amino-2,3-dimethylthiamorpholine for the N-aminohexamethyleneimine there is obtained 1-(5-indansulfonyl) - 3 - (2,3-dimethyl-4-thiamorpholinyl)urea.

EXAMPLE 17

*1-(4-Indansulfonyl)-3-(3-Methyl-1-Pyrrolidinyl)Urea*

(A) PREPARATION OF 3-METHYL-1-NITROSOPYRROLIDINE

Following the procedure of Example 1A but substituting 42.5 grams of 3-methylpyrrolidine for the hexamethyleneimine, there is obtained 3-methyl-1-nitrosopyrrolidine.

(B) PREPARATION OF 1-AMINO-3-METHYLPYRROLIDINE

Following the procedure of Example 1B but substituting 38 grams of 3-methyl-1-nitrosopyrrolidine for the N-nitrosohexamethyleneimine, there is obtained 1-amino-3-methylpyrrolidine.

(C) PREPARATION OF 1-(4-INDANSULFONYL)-3-(3-METHYL-1-PYRROLIDINYL)UREA

Following the procedure of Example 5C but substituting 10 grams of 1-amino-3-methylpyrrolidine for the 1- amino-4-methylpiperazine there is obtained 1-(4-indansulfonyl)-3-(3-methyl-1-pyrrolidinyl)urea.

EXAMPLE 18

*1-(5-Indansulfonyl)-3-(Dimethylamino)Urea*

Following the procedure of Example 1C but substituting 6.0 grams of dimethylhydrazine for the N-aminohexamethyleneimine, there is obtained 1-(5-indansulfonyl)-3-(dimethylamino)urea.

EXAMPLE 19

*1-(5-Indansulfonyl)-3-(2,2'-Dihydroxydiethylamino)Urea*

Following the procedure of Example 1C but substituting 12 grams of 2,2'-dihydroxydiethylamine for the N-aminohexamethyleneimine there is obtained 1-(5-indansulfonyl)-3-(2,2'-dihydroxydiethylamino)urea.

EXAMPLE 20

*1-(5-Indansulfonyl)-3-(1-Hexahydroazepinyl)Urea Hydrochloride*

A solution of 3.37 grams of 1-(5-indansulfonyl)-3-(1-hexahydroazepinyl)urea in absolute alcohol is cooled and treated with 10 ml. of a 1 N ethereal hydrogen chloride solution. Anhydrous ether is then added to complete the precipitation of the salt. The solid is filtered, washed thoroughly with anhydrous ether and air dried to give the desired 1-(5-indansulfonyl)-3-(1-hexahydroazepinyl)-urea hydrochloride.

EXAMPLE 21

*1-(5-Indansulfonyl)-3-(1-Piperidyl)Urea Tartrate*

A solution of 3.23 grams of 1-(5-indansulfonyl-3-(1-piperidyl)urea in absolute alcohol is treated with a solution of 0.75 gram of tartaric acid in absolute alcohol. The solvent is removed under reduced pressure and the residue washed thoroughly with ether to give the desired 1-(5-indansulfonyl)3-(1-piperidyl)urea tartrate.

What is claimed is:

1. A compound selected from the group consisting of sulfonylureas of the formula

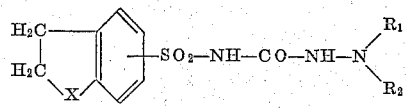

and

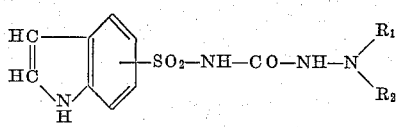

wherein X is a member of the group consisting of $CH_2$, NCO(lower alkyl), NH, O, and S; $R_1$ and $R_2$ each represents a member of the group consisting of lower alkyl, hydroxy-lower alkyl and phenyl-lower alkyl; and $R_1$ and $R_2$ together represent a member of the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene and thiahexamethylene, and physiologically acceptable acid addition salts of said sulfonylureas.

2. A compound of the formula

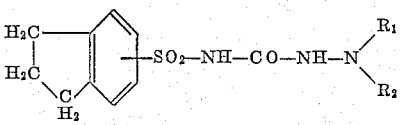

wherein $R_1$ and $R_2$ each represents a member of the group consisting of lower alkyl, hydroxy-lower alkyl, and phenyl-lower alkyl, and $R_1$ and $R_2$ together represent a member of the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene, and thiahexamethylene.

3. A compound of the formula

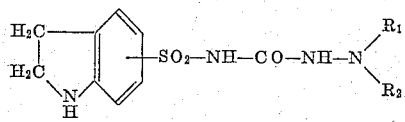

wherein $R_1$ and $R_2$ each represents a member of the group consisting of lower alkyl, hydroxy-lower alkyl and phenyl-lower alkyl, and $R_1$ and $R_2$ together represent a member of the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene and thiahexamethylene.

4. A compound of the formula

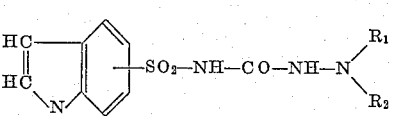

wherein $R_1$ and $R_2$ each represents a member of the group consisting of lower alkyl, hydroxy-lower alkyl and phenyl-lower alkyl, and $R_1$ and $R_2$ together represent a member of the group consisting of tetramethylene, pentamethylene, hexamethylene, oxatetramethylene, oxapentamethylene, oxahexamethylene; azatetramethylene, azapentamethylene, azahexamethylene, thiatetramethylene, thiapentamethylene and thiahexamethylene.

5. A compound of the formula

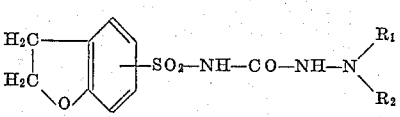

wherein $R_1$ and $R_2$ each represents a member of the group consisting of lower alkyl, hydroxy-lower alkyl, and phenyl-lower alkyl, and $R_1$ and $R_2$ together represent a member of the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene and thiahexamethylene.

6. 1-(5-indansulfonyl)-3-(1-hexahydroazepinyl)urea.
7. 1-(5-indansulfonyl)-3-(1-piperidyl)urea.
8. 1-(2,3-dihydro - 6 - thionaphthenesulfonyl) - 3 - (1-piperidyl)urea.
9. 1-(cumaran-6-sulfonyl)-3-(1-piperidyl)urea.
10. 1-(5-indansulfonyl) - 3 - (2,3-dimethyl-4-thiamorpholinyl)urea.
11. 1-(4 - indansulfonyl)-3-(3-methyl-1-pyrrolidinyl)-urea.

References Cited in the file of this patent

UNITED STATES PATENTS 3,063,903    Wright _____ Nov. 13, 1962

OTHER REFERENCES

Haack: Arzn. Forsch., volume 8, No. 7a, pages 444–448 (1958).

Dulin et al.: Proceedings of the Society for Experimental Biology and Medicine, volume 107, pages 245–248 (1961).